US009250690B2

United States Patent
Menard et al.

(10) Patent No.: US 9,250,690 B2
(45) Date of Patent: Feb. 2, 2016

(54) LOW-POWER MODES OF MICROCONTROLLER OPERATION WITH ACCESS TO CONFIGURABLE INPUT/OUTPUT CONNECTORS

(75) Inventors: Patrice Menard, Saint-Mars-Du-Desert (FR); Mickael Le Dily, Carquefou (FR); Thierry Gourbilleau, Le Loroux-Bottereau (FR)

(73) Assignee: Atmel Corporation, San Jose, CA (US)

( * ) Notice: Subject to any disclaimer, the term of this patent is extended or adjusted under 35 U.S.C. 154(b) by 724 days.

(21) Appl. No.: 13/608,203

(22) Filed: Sep. 10, 2012

(65) Prior Publication Data

US 2014/0075066 A1    Mar. 13, 2014

(51) Int. Cl.
*G06F 3/00* (2006.01)
*G06F 13/00* (2006.01)
*G06F 13/24* (2006.01)
*G06F 7/38* (2006.01)
*H03K 19/173* (2006.01)
*G06F 1/26* (2006.01)
*G06F 1/32* (2006.01)
*G06F 13/38* (2006.01)

(52) U.S. Cl.
CPC ............ *G06F 1/3243* (2013.01); *G06F 13/385* (2013.01); *Y02B 60/1235* (2013.01); *Y02B 60/1239* (2013.01); *Y02B 60/32* (2013.01)

(58) Field of Classification Search
CPC ................. G01R 31/318572; G01R 31/31715; G01R 31/31713; G06F 1/3243
USPC ................ 710/10, 31, 104, 260–269; 326/38; 713/320, 323, 324
See application file for complete search history.

(56) References Cited

U.S. PATENT DOCUMENTS

| | | | |
|---|---|---|---|
| 5,553,236 A * | 9/1996 | Revilla et al. .................... 714/25 |
| 5,574,850 A * | 11/1996 | Fandrich ......................... 714/5.1 |
| 7,069,376 B2 * | 6/2006 | Mathewson et al. .. G06F 9/3867 710/104 |
| 7,091,348 B2 | 8/2006 | O'Neill et al. |
| 7,908,500 B2 | 3/2011 | Westwick et al. |
| 8,010,819 B2 | 8/2011 | Pastorello et al. |
| 8,547,135 B1 * | 10/2013 | Yarlagadda et al. ............. 326/38 |
| 8,736,302 B2 * | 5/2014 | Zhang et al. .......... H03K 19/177 326/101 |
| 2002/0087900 A1* | 7/2002 | Homewood et al. .......... 713/320 |
| 2003/0079166 A1* | 4/2003 | Vermeulen ..... G01R 31/318558 714/727 |
| 2009/0153211 A1* | 6/2009 | Hendin et al. ................. 327/198 |
| 2012/0054518 A1* | 3/2012 | Sadowski et al. .............. 713/322 |
| 2012/0159217 A1* | 6/2012 | Venkataramanan et al. ...................... G06F 1/3203 713/323 |
| 2014/0075066 A1 | 3/2014 | Menard et al. |
| 2015/0253839 A1 | 9/2015 | Jouin et al. |

OTHER PUBLICATIONS

Atmel Corporation, 32-bit AVR UC3 Microcontrollers: Application Note, "AVR32119: Getting Started with 32-bit AVR UC3 A0/A1/A3/A4 series Flash Microcontroller," 18 pages (Mar. 2010).
USPTO, Examiner Suryawanshi, Suresh, Non-Final OA dated Sep. 4, 2014 in U.S. Appl. No. 13/606,515, filed Sep. 7, 2012 (7 pages).
USPTO, Examiner Suresh Suryawanshi, Notice of Allowance dated Mar. 24, 2015, U.S. Appl. No. 13/606,515, filed Sep. 7, 2012 (5 pages).
Atmel Corp, "8-bit Atmel Microcontroller with 128Kbytes In-System Programmable Flash," ATmega128, ATmega128L, 386 pages (Jun. 2011).

* cited by examiner

*Primary Examiner* — Faisal M Zaman
(74) *Attorney, Agent, or Firm* — Fish & Richardson P.C.

(57) ABSTRACT

A microcontroller includes I/O pins whose respective functions are configurable by an I/O controller in accordance with user-programmable input. The availability of such configurable I/O pins is extended to low-power or power savings modes of operation during which the I/O controller is powered off or deactivated.

17 Claims, 3 Drawing Sheets

LOW-POWER MODES OF MICROCONTROLLER OPERATION WITH ACCESS TO CONFIGURABLE INPUT/OUTPUT CONNECTORS

FIELD OF THE DISCLOSURE

This disclosure relates to low-power modes of microcontroller operation with access to configurable input/output (I/O) connectors, such I/O pins or I/O pads.

BACKGROUND

Some microcontrollers include, as part of their core components, a general purpose input/output (GPIO) controller that manages all the I/O pins on the chip. In some cases, a user can specify the function of each I/O pin, which then is configured accordingly by the GPIO controller.

Many microcontrollers have one or more low-power modes, during which core components, such as the GPIO controller are powered off or deactivated so as to reduce power consumption. Although I/O pins having dedicated functions could be coupled directly to the backup power management, for example, by bypassing the GPIO controller, such an arrangement provides limited flexibility in the overall system during low-power modes of operation because the function of each such I/O pin is fixed.

SUMMARY

The disclosure described here facilitates extending the availability of configurable I/O pins or other I/O connectors to low-power or power savings modes of operation during which the I/O controller is powered off or deactivated.

In one aspect, for example, a microcontroller that is operable in a power savings mode includes one or more input/output (I/O) pins. The microcontroller includes an I/O controller to configure, in accordance with user-programmable input, each respective I/O pin either for use as a general-purpose I/O pin or for assignment to a function associated with a peripheral device. At least some of the I/O pins are coupled to the I/O controller, which is operable to provide, as its output, a signal from a selected one of the I/O pins. The microcontroller also includes a selector coupled to the output of the I/O controller, and also coupled to a particular one of the I/O pins by a path that does not pass through the I/O controller. The selector selects, in accordance with user-programmable input, either the output of the I/O controller or the path that does not pass through the I/O controller. The microcontroller further includes an external interrupt controller to receive a signal passing through the selector based on the selection by the selector. The external interrupt controller is operable, in response to receiving the signal from the selector, to provide an output signal that causes the microcontroller to exit the power savings mode. The I/O controller is powered off or deactivated while the microcontroller is in the power savings mode.

According to another aspect, a microcontroller that is operable in a low-power mode includes one or more input/output (I/O) connectors (e.g., I/O pins or I/O pads). The microcontroller includes an I/O controller to configure the one or more I/O connectors in accordance with respective user-programmable functions. At least some of the I/O connectors are coupled to the I/O controller, which is operable to provide, as its output, a signal from a selected one of the I/O connectors. The I/O controller is arranged so that it is powered off or deactivated when the microcontroller is in the low-power mode. The microcontroller also includes a backup domain comprising at least the following components that remain powered on when the microcontroller is in the low-power mode:

a multiplexer coupled to the output of the I/O controller, and also coupled to a particular one of the I/O connectors by a connection line that bypasses the I/O controller, wherein the multiplexer is operable to select, in accordance with user-programmable input, either the output of the I/O controller or the connection line from the particular one of the I/O connectors; and a unit to receive a signal passing through the multiplexer based on the selection by the multiplexer, the unit being operable, to take a specified action in response to receiving the signal from the multiplexer (e.g., to provide an output signal that causes the microcontroller to exit the low-power mode).

Yet another aspect relates to a method of operating a microcontroller that has a low-power mode of operation. The microcontroller includes backup domain components that remain powered up when the microcontroller is in the low-power mode and core domain components that are powered off or deactivated in the low-power mode. The method includes using an I/O controller to configure a particular I/O connector in accordance with user-programmable functions and causing one or more latches associated with the particular I/O connector to retain configuration information received from the I/O controller for the particular I/O connector. The method also includes, after causing the one or more latches to retain the configuration information, causing the microcontroller to enter the low-power mode, during which the I/O controller is powered off or deactivated. The method further includes routing a signal from the particular I/O connector to a unit in the backup domain in a manner that bypasses the I/O controller while the microcontroller is in the low-power mode.

Some implementations allow an I/O connector that is configurable by the I/O controller to be used for receiving a signal that is monitored, for example, by an external interrupt controller in the microcontroller so as to trigger an external interrupt that can be used, for example, to wake up the microcontroller and cause it to exit the low-power (or power savings) mode and return to active mode. The foregoing techniques, including use of the multiplexer in the backup domain, can be accomplished without adding significant complexity to the backup domain circuitry. At the same time, the I/O controller can remain part of the core domain circuitry that is powered off or deactivated during the low-power mode to reduce power consumption.

Other aspects, features and advantages will be apparent from the following detailed description, the accompanying drawings and the claims.

DETAILED DESCRIPTION

Figure 1:
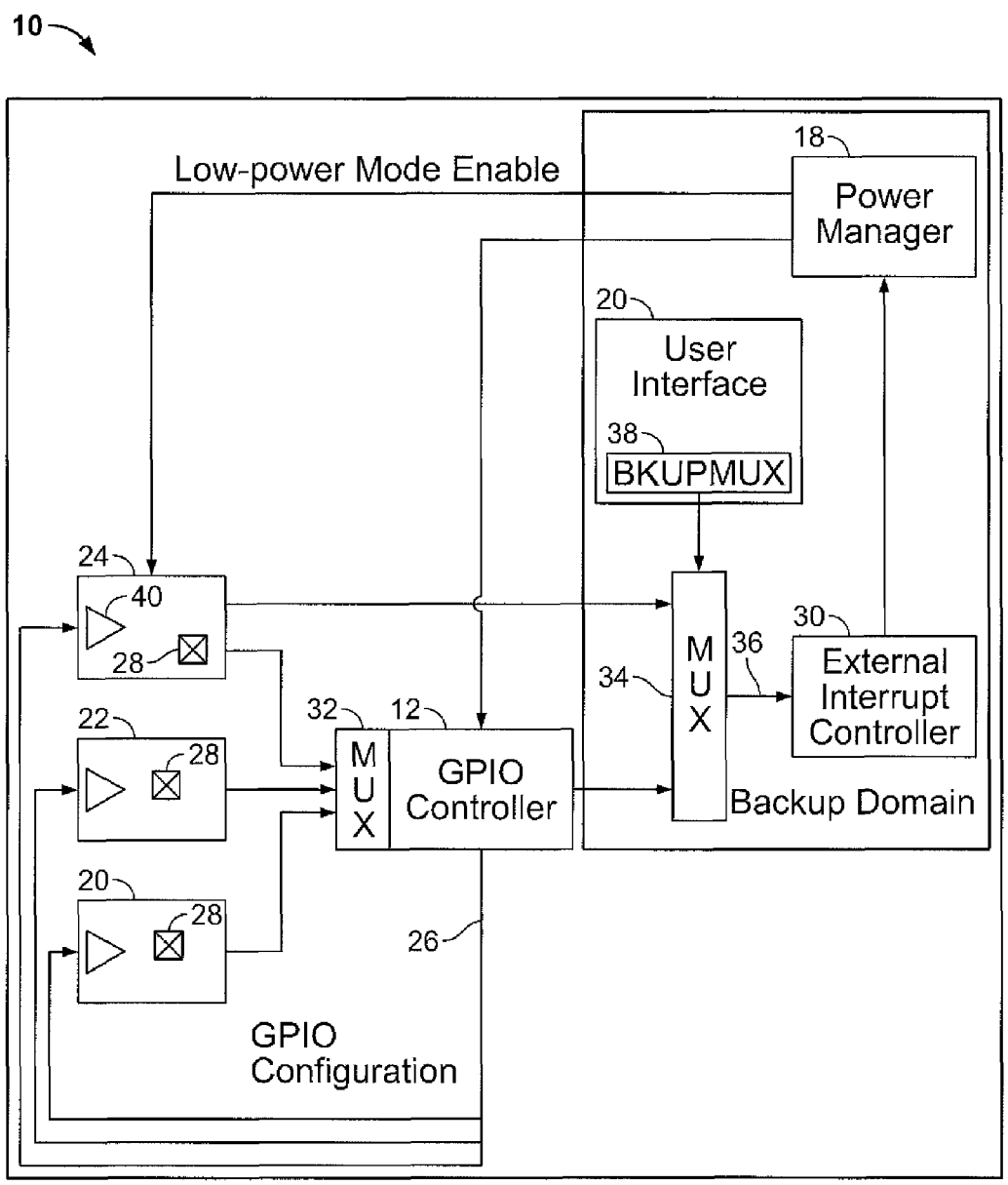
FIG. 1 is a block diagram showing an example of a microcontroller including a configurable I/O pin that is available for use in a low-power mode.

As illustrated in FIG. 1, a microcontroller 10, which may be implemented, for example, as an integrated circuit chip, includes a GPIO controller 12 that forms part of microcontroller's core domain. Microcontroller also 10 includes a power manager 18 that forms part of the microcontroller's backup domain and remains powered on even when microcontroller 10 is in the low-power mode. Among other things, power manager 18 controls when microcontroller 10 is placed into a low-power mode. During the low-power mode, components in the core domain, including GPIO controller 12, are powered off or deactivated. The low-power mode sometimes may be referred to as a "shutdown mode" or "backup mode." Some implementations may include other power-savings modes, although GPIO controller 12 may not necessarily be powered off or deactivated during all the other power-savings modes.

In the illustrated example, the backup domain also includes an external interrupt controller (EIC) 30, discussed in greater detail below. In some implementations, the backup domain includes other components as well, such as backup registers, an asynchronous timer, a watchdog timer, and a serial receiver/transmitter interface.

Microcontroller 10 also includes a user interface 20 that allows a user to program various aspects of the microcontroller's functionality.

Microcontroller 10 further includes multiple I/O pins, several of which are illustrated in FIG. 1 (i.e., I/O pins 20, 22, 24). The I/O pins allow signals to be received by microcontroller 10 from external locations and allow microcontroller 10 to send signals to external locations. Although FIG. 1 illustrates only three I/O pins, microcontroller 10 may have many more I/O pins, which allow microcontroller 10 to send signals to locations outside the chip and to receive signals from outside the chip. Furthermore, in some implementations, the I/O pins may take the form of other types of I/O connectors, such as I/O pads.

GPIO controller 12 manages and controls the I/O pins, including I/O pins 20, 22, 24. In a particular implementation, GPIO user interface registers are organized into ports, each of which controls thirty-two different I/O pins, which are configurable through a peripheral bus interface 26. Each port can include a respective set of configuration registers 28 in the I/O pins. Thus, GPIO controller 12 enables a programmer to configure each I/O pin for use as a general-purpose I/O pin or to be assigned to a function associated with a peripheral device (e.g., USART or SPI). During active (i.e., run) mode, the I/O pin (e.g., 20, 22, 24) signals are selected by GPIO controller 12 using a first selector such as multiplexer 32. As explained in greater detail below, one or more of the configurable I/O pins (e.g., I/O pin 24) also serves as a backup I/O pin that can be used even when microcontroller 10 is in the low-power mode.

In the illustrated example, a respective pull-up/pull-down resistor and slew rate controller are integrated with each I/O pin (including I/O pins 20, 22, 24). Programming these features can be performed independently for each I/O pin through GPIO controller 12. After reset, the I/O pins can default as inputs with the pull-up and pull-down resistors disabled and the slew rate controller enabled.

In the illustrated example, I/O pins 20, 22 currently are assigned to the external interrupt controller (EIC) 30, which is part of the backup domain and remains powered on even when microcontroller 10 is in the low-power mode. EIC 30 allows I/O pins to be configured as external interrupts, where each external interrupt has its own interrupt request and can be individually masked. In various implementations, each external interrupt can generate an interrupt on a rising or falling edge, or on a high or low level signal. In some cases, the external interrupts can be used to wake up microcontroller 10 from power save modes.

As shown in FIG. 1, an additional selector such as multiplexer 34 is provided in the backup domain and also remains powered on when microcontroller 10 is in the low-power mode. An output line 36 from multiplexer 34 is coupled as an input to EIC 30. Through user interface 20, a programmer can choose when multiplexer 34 is configured to pass I/O signals from GPIO controller 12 to ETC 30 and when it is configured to pass signals from a backup I/O pin (e.g., I/O pin 24) to EIC 30 in a manner that bypasses GPIO controller 12. In particular, user interface 20 includes a back-up multiplexer ("BKUPMUX") register 38 that can be configured by a user (e.g., through software) to select whether signals from GPIO controller 12 or backup I/O pin 24 are passed to ETC 30.

For example, during the active mode when the core domain (including GPIO controller 12) is powered on, GPIO controller 12 controls which of the signals from I/O pins 20, 22, 24 pass through multiplexer 32 and is provided to EIC 30. Thus, by programming GPIO controller 12, a user can assign EIC line 36 to any one of I/O pins 20, 22, 24. On the other hand, during the low-power mode, GPIO controller 12 is powered off or deactivated so as to reduce power consumption. Since I/O pins 20, 22 can be coupled to EIC 30 only by way of GPIO controller 12, those pins cannot be used to trigger an interrupt while microcontroller 10 is in the low-power mode. Nevertheless, as noted above, one or more I/O pins (e.g., I/O pin 24) are coupled directly to multiplexer 34 in the backup domain and, as explained below, allow the external interrupt functionality of EIC 30 to be extended to the low-power mode.

Figure 2:
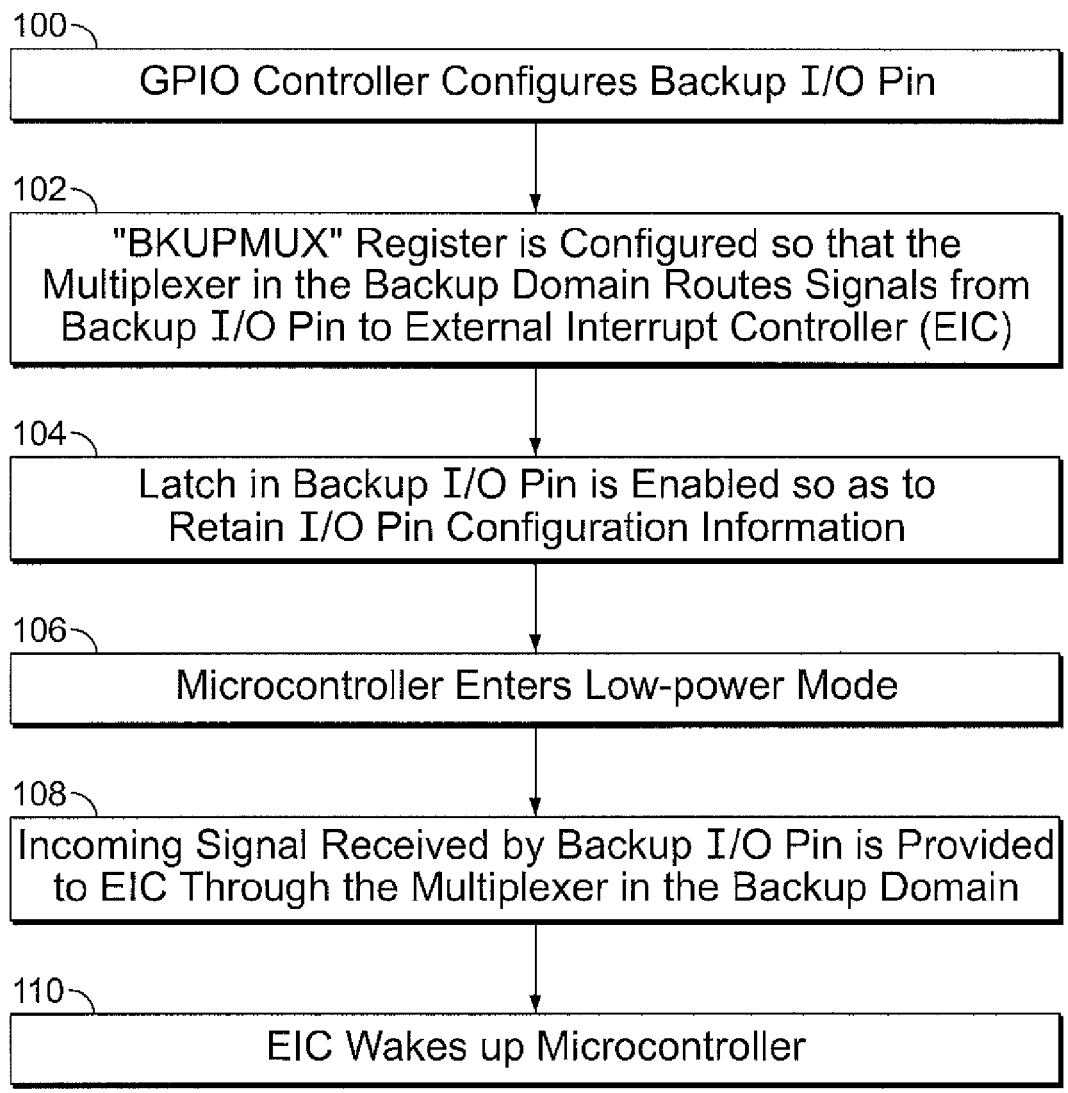
FIG. 2 is a flow chart illustrating a method of operation of the microcontroller of FIG. 1.

To extend the external interrupt functionality to the low-power mode, backup I/O pin 24 should be configured by GPIO controller 12 for that functionality before microcontroller 10 enters the low-power mode (FIG. 2, block 100). The configuration information may include, for example, a signal specifying that the I/O pin 24 as an input I/O. As described above, the configuration information is sent by GPIO controller 12 over peripheral bus interface 26. In some cases, I/O pin 24 already may have been configured. However, since the I/O pins, including I/O pin 24, are configurable by GPIO controller 12 as a general purpose I/O pin or can be assigned to a function of a peripheral device, I/O pin 24 may previously have been configured differently and, therefore, may need to be configured again prior to microcontroller 10 entering the low-power mode.

Also, to extend the external interrupt functionality to the low-power mode, the user should configure the BKUPMUX register 38 so that multiplexer 36 routes signals from backup I/O pin 24 to EIC 30 (FIG. 2, block 102). This task also should be performed before microcontroller 10 enters the low-power mode.

Just prior to microcontroller 10 entering the low-power mode (i.e., just before the core logic, including GPIO controller 12, is powered down or deactivated), power manager 18 provides a signal ("low-power mode enable") to enable latches 40 in I/O pin 24 (FIG. 2, block 104). Latches 40 can be implemented, for example, as flip-flops or other logic. When latches 40 are enabled, they retain the values of the most recent I/O pin configuration information that was received from GPIO controller 12. The I/O pin configuration information may include, for example, one or more of an "input data" signal indicating whether a logical one ("1") or zero ("0") is driven onto the I/O pin, an "enable" signal to select whether the I/O pin is used as an input or an output, and a "drive strength control" input signal to choose between multiple drive strength. This or other pin configuration information (e.g., slew rate) can be retained even after microcontroller 10 enters the low-power mode (i.e., even after GPIO controller 12 is powered off or deactivated). Microcontroller 10 then enters the low-power mode (FIG. 2, block 106).

The foregoing operations allow an I/O pin (in this case I/O pin 24) that is configurable by GPIO controller 12 to be used for receiving a signal that is monitored by EIC 30 (FIG. 2, block 108) so as to trigger an external interrupt that can be used, for example, to wake up microcontroller 10 and cause it to exit the low-power mode and return to active mode (FIG. 2, block 110). In particular, a signal on I/O pin 24 is passed to multiplexer 34 in the backup domain. Multiplexer 34, in turn, passes the signal to EIC 30 which generates a signal to wake up microcontroller 10 and return it to the active (i.e., run) mode. Other I/O pins (e.g., I/O pins 20, 22) may remain unused while microcontroller 10 is in the low-power mode because they are coupled to the backup domain only through I/O controller 12, which remains powered off or deactivated in the lower-power mode.

The user can program BKUPMUX register 38 so that it either remains active or becomes deactivated when microcontroller 10 returns to the active (i.e., run) mode. If BKUPMUX register is deactivated when microcontroller 10 returns to the active mode, then control of I/O pins 20, 22, 24 will return to GPIO controller 12, which is powered on or activated during the active mode.

The foregoing techniques, including use of multiplexer 36 in the backup domain, can be accomplished without adding significant complexity to the backup domain circuitry. At the same time, GPIO controller 12 can remain part of the core domain circuitry that is powered off or deactivated during the low-power mode to reduce power consumption. In addition, the addition of multiplexer 36 does not degrade the multiplexing capabilities within GPIO controller 12.

In the illustrated example, backup I/O pin 24 is enabled for use both in the active mode and in the low-power mode. In some implementations, however, backup I/O pin 24 may be used only for the low-power mode. Furthermore, although the illustrated example refers to only one of the I/O pins as being available for use during the low-power mode, other implementations may include multiple such I/O pins, each of which can be configured by GPIO controller 12 prior to microcontroller 10 entering the low-power mode. In that case, multiplexer 34 would select from among the output of GPIO controller 12 and the connection lines for the I/O pins that bypass GOIP controller 12.

Figure 3:
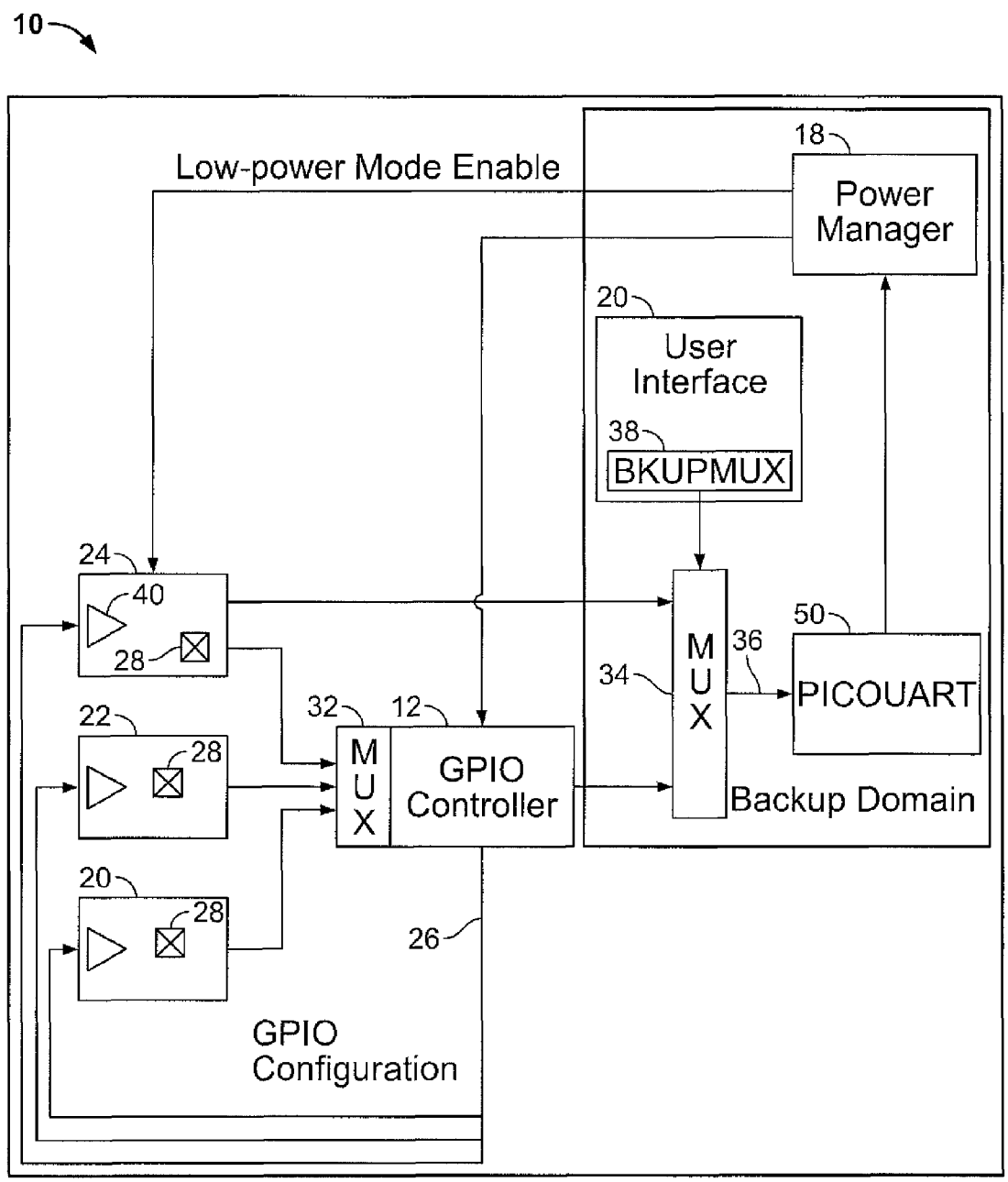
FIG. 3 is a block diagram of showing an example of a microcontroller including a configurable I/O pin that is available for use in a low-power mode.

Also, in the foregoing example, an I/O pin that is configurable by GPIO controller 12 and that can be used in the low-power mode is assigned to EIC 30 so as to trigger an external interrupt and wake-up microcontroller 10. A similar approach can be used to monitor external signals on one or more I/O pins that are configurable by GPIO controller 12 and that can be used in the low-power mode where the configurable I/O pins are assigned to another component in the backup domain, for example, a picopower universal asynchronous receiver/transmitter (PICOUART) 50, as shown in FIG. 3. PICOUART 50 provides a minimalistic universal asynchronous receiver/transmitter (UART) receiver (RX) line feature in a low-power mode and allows the device to be awakened from the low-power mode by monitoring the RX line. In this case, I/O pin 24 would be assigned to PICOUART 50.

Other implementations are within the scope of the claims.

What is claimed is:

1. A microcontroller operable in a low-power mode, the microcontroller comprising:
   one or more input/output (I/O) connectors;
   an I/O controller to configure the one or more I/O connectors in accordance with respective user-programmable functions, wherein at least some of the I/O connectors are coupled to the I/O controller, which is operable to provide, as its output, a signal from a selected one of the I/O connectors, wherein the I/O controller is arranged so that it is powered off or deactivated when the microcontroller is in the low-power mode;
   a backup domain comprising at least the following components that remain powered on when the microcontroller is in the low-power mode:
      a multiplexer coupled to the output of the I/O controller, and also coupled to a particular one of the I/O connectors by a connection line that bypasses the I/O controller, wherein the multiplexer is operable to select, in accordance with user-programmable input, either the output of the I/O controller or the connection line from the particular one of the I/O connectors; and
      a unit to receive a signal passing through the multiplexer based on the selection by the multiplexer, the unit being operable, to take a specified action in response to receiving the signal from the multiplexer.

2. The microcontroller of claim 1 wherein the I/O controller is operable to configure each of the I/O connectors for use as a general-purpose I/O connector or to assign each I/O connector to a function associated with a peripheral device.

3. The microcontroller of claim 1 wherein the I/O connectors comprise at least one of either I/O pins or I/O pads.

4. The microcontroller of claim 1 wherein the unit in the backup domain is an external interrupt controller to which the particular I/O connector is assigned.

5. The microcontroller of claim 1 wherein the particular one of the I/O connectors includes one or more latches that are enabled before the microcontroller enters the low-power mode so as to retain I/O connector configuration information from the I/O controller while the microcontroller is in the low-power mode.

6. The microcontroller of claim 5 wherein the backup domain includes a power manager that is operable to provide a signal to enable the one or more latches.

7. The microcontroller of claim 1 wherein the unit to receive the signal passing through the multiplexer is operable, in response to receiving the signal from the multiplexer, to provide an output signal that causes the microcontroller to exit the low-power mode.

8. A method of operating a microcontroller that has a low-power mode of operation, the microcontroller including backup domain components that remain powered up when the microcontroller is in the low-power mode and core domain components that are powered off or deactivated in the low-power mode, the method comprising:
   using an input/out (I/O) controller to configure a particular I/O connector in accordance with user-programmable functions;
   causing one or more latches associated with the particular I/O connector to retain configuration information received from the I/O controller for the particular I/O connector;
   after causing the one or more latches to retain the configuration information, causing the microcontroller to enter the low-power mode, wherein the I/O controller is powered off or deactivated while the microcontroller is in the low-power mode;

causing a multiplexer in the backup domain to be configured so as to connect a path from the particular I/O connector to a unit in the backup domain in a manner that bypasses the I/O controller; and routing a signal from the particular I/O connector to the unit in the backup domain in a manner that bypasses the I/O controller while the microcontroller is in the low-power mode.

9. The method of claim 8 wherein the signal from the particular I/O connector is routed to an external interrupt controller to which the particular I/O connector is assigned.

10. The method of claim 8 wherein causing the one or more latches to retain the configuration information includes enabling the one or more latches by providing a signal to the one or more latches from a power manager in the backup domain.

11. The method of claim 8 including configuring the multiplexer in the backup domain in response to user-programmable input.

12. The method of claim 8 wherein, in response to receiving the signal from the particular I/O connector, the unit in the backup domain generates a signal that causes the microcontroller to exit the low-power mode.

13. The method of claim 12 wherein, when the microcontroller exits the low-power mode, the multiplexer couples an output of the I/O controller to the unit in the backup domain.

14. A microcontroller operable in a power savings mode, the microcontroller comprising:

one or more input/output (I/O) pins;

an I/O controller to configure, in accordance with user-programmable input, each respective I/O pin either for use as a general-purpose I/O pin or for assignment to a function associated with a peripheral device, wherein at least some of the I/O pins are coupled to the I/O controller, which is operable to provide, as its output, a signal from a selected one of the I/O pins, a selector coupled to the output of the I/O controller, and also coupled to a particular one of the I/O pins by a path that does not pass through the I/O controller, wherein the selector selects, in accordance with user-programmable input, either the output of the I/O controller or the path that does not pass through the I/O controller; and an external interrupt controller to receive a signal passing through the selector based on the selection by the selector, the external interrupt controller being operable, in response to receiving the signal from the selector, to provide an output signal that causes the microcontroller to exit the power savings mode, wherein the I/O controller is powered off or deactivated while the microcontroller is in the power savings mode.

15. The microcontroller of claim 14 wherein the particular one of the I/O pins includes one or more latches that are enabled before the microcontroller enters the power savings mode so as to retain I/O connector configuration information from the I/O controller while the microcontroller is in the power savings mode.

16. The microcontroller of claim 14 wherein the particular I/O pin is configured by the I/O controller to serve as an external interrupt that causes the external interrupt controller to generate an interrupt on a rising or falling edge of the signal from the selector.

17. The microcontroller of claim 14 wherein the selector is a multiplexer.

* * * * *